Aug. 30, 1949.                J. M. VALLONE ET AL                2,480,524
                                 TRAILING CASTER
                              Filed Nov. 5, 1945

INVENTOR
Joseph M. Vallone
and
BY  Charles Sedita
Parker Prochnow & Farmer
ATTORNEYS Patented Aug. 30, 1949

2,480,524

UNITED STATES PATENT OFFICE 2,480,524

TRAILING CASTER

Joseph M. Vallone and Charles Sedita, Buffalo, N. Y., assignors to Barcalo Manufacturing Company, Buffalo, N. Y.

Application November 5, 1945, Serial No. 626,881

2 Claims. (Cl. 16—35)

This invention relates to casters of the trailer type having relatively large wheels which are used extensively for the trailing casters on wheelchairs. It is desirable to utilize on wheelchairs, trailing casters of this type in order that a minimum of power be required to propel the chair, and the shocks caused by the rolling of the wheels over cracks in a floor lessened, but serious difficulty has been encountered with such casters, due to their tendency to shimmy and create an objectionable noise and vibration of the chair, even when the chair is pushed at speeds of a fairly slow walk or higher. Such noise and vibration is seriously objected to by hospital authorities, and by attendants operating the chair.

An object of the invention is to provide an improved caster of the trailing type which may be successfully used on wheelchairs and the like; with which shimmy is effectively prevented; with which no radical change in the design of the casters is required; with which existing casters may have the shimmy removed by a simple attachment; and which will be relatively simple, efficient and inexpensive.

Various other objects and advantages will be apparent from the following description of two embodiments of the invention, and the novel features will be particularly pointed out hereinafter in connection with the appended claims.

Figure 1:
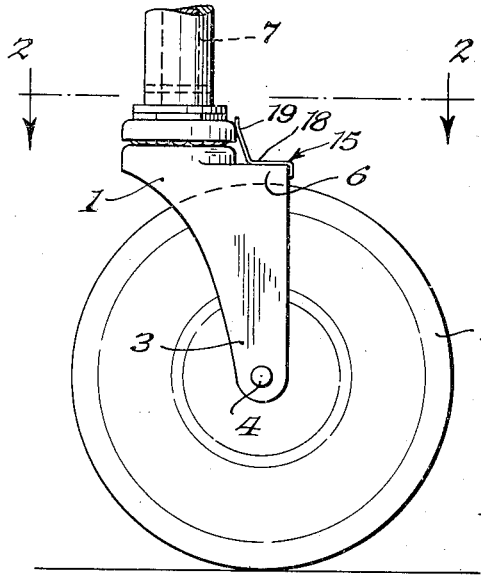
Fig. 1 is a side elevation of a caster constructed in accordance with this invention.
Figure 2:
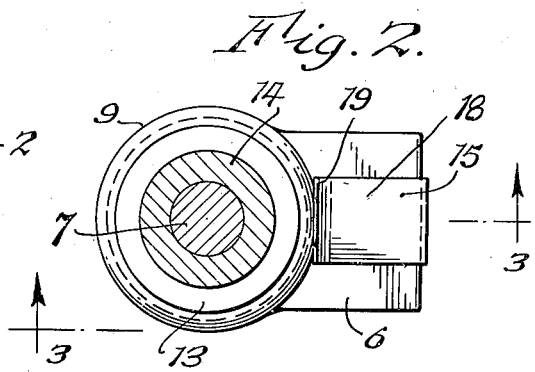
Fig. 2 is a sectional plan of the same, the section being taken approximately along the line 2—2 of Fig. 1.
Figure 3:
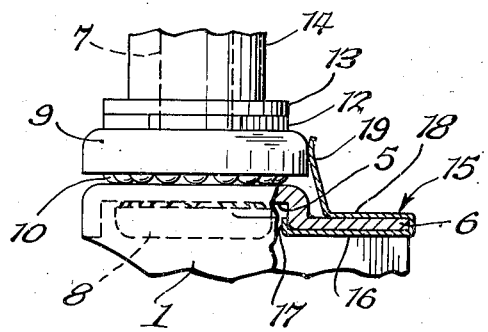
Fig. 3 is a partial side elevation and partial section of the same, the section being taken approximately along the line 3—3 of Fig. 2.

In the embodiment of the invention illustrated in Figs. 1 to 3, the caster is of the trailing type and includes a U-shaped member or fork 1 of sheet metal, and a wheel 2 is disposed between the arms 3 of the fork and rotatably supported on a pivot pin 4 which extends between the free end portions of the arms of the fork.

The cross part of the U or fork may be termed a base which has drawn upwardly therefrom a cup-shaped, downwardly opening recess 5, see Fig. 3, which occupies only a portion of the cross part of the U or base leaving at one side thereof a lateral portion or extension 6 directly above the pivot pin 4. A bearing or supporting spindle 7 extends centrally through and is rotatably mounted in, the bottom or end wall of the recess 5. Within the recess 5 the end of the spindle rigidly mounts a bearing cup 8, Fig. 3, which confines a circular row of ball-bearings against the inside face of the bottom or end wall of the recess 5. The end of the spindle is upset or flanged beneath the shell 8 so as to confine the shell against endwise movement on the spindle. A similar bearing shell 9 is fixedly secured upon the spindle 7 above the base or cross bar of the fork, and this shell 9 confines a plurality of balls 10 against the upper face of the base of the fork. Mounted on the spindle above the shell 9 is a hexagonal washer 12, which fits over a hexagonal head (not shown) on the bearing spindle and against which the shell 9 abuts, and a plain washer plate 13 abuts washer 12. A sleeve or bushing 14 telescopes over the spindle 7. Casters of this type as so far described, are well known in the art but they have a tendency to shimmy when a wheelchair equipped with them is propelled over any floor. This invention has to do with the changes required for eliminating such shimmy.

A somewhat U-shaped member 15, formed of flat ribbon or sheet metal and bent into a narrow U-shape, slidingly embraces the extension or portion 6 of the base of the fork, and the free end of the under arm 16 thereof is bent upwardly to form a flange 17 which engages in the recess 5. The cross part of the member 15 abuts the edge of the extension 6, it being understood that the arm 16 extends between the arms 3 of the fork. The upper arm 18 of this member 15 is longer than the underarm 16 and extends for a substantial distance upon the upper face of the base of the fork, and then is bent upwardly as at 19 so as to bear against the periphery of the shell 9. This periphery of the shell 9 is concentric with the axis of rotation of the shell as the fork swivels on the spindle 7.

The arm 19 is of spring metal and flexed by shell 9 so as to exert a substantial spring pressure against shell 9. By resiliently pressing against the periphery of the shell 9, it frictionally resists rotation of the fork or U-shaped wheel mounting, and also resiliently and yieldingly opposes all other movement between the spindle 7 and the fork, such as due to looseness or play in the connection between the spindle and the fork.

Figure 4:
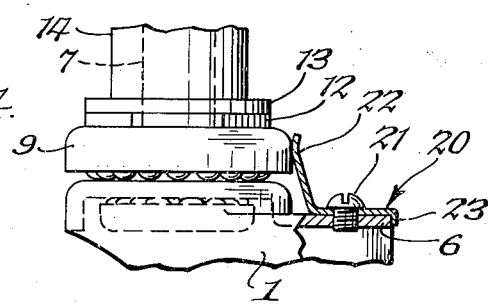
Fig. 4 is a partial section and partial elevation similar to Fig. 3, but illustrating a modification of the invention.
Figure 5:
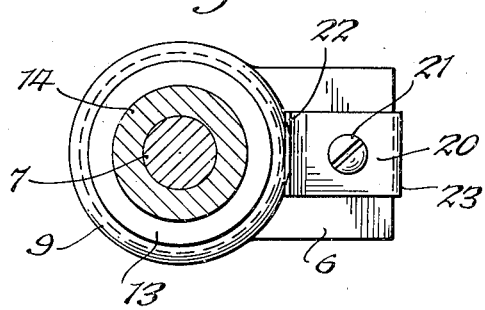
Fig. 5 is a plan similar to Fig. 2, but illustrating the modication of Fig. 4.

In Figs. 4 and 5 the construction is similar to that shown in Figs. 1 to 3, except that the member 20, which corresponds to the member 15, instead of being attached as a spring clamp upon the extension 6, rests upon the upper face thereof, and is detachably secured thereto by a suitable coupling such as a screw 21, the shank of which passes through an aperture in the member 20 and threads into the base 6. The member 20, at one end, has an upstanding spring arm 22 which corresponds to the arm 19 of Figs. 1 to 3 that bears against the periphery of the ball shell 9. The other end of the member 20 is turned downwardly to form a flange 23 which engages against the outer edge of the extension 6, which prevents turning of the member 20 on the extension 6 when secured thereto by only one screw.

In both embodiments of the invention, it will be noted that the fork member of the caster carries a spring arm which bears radially against a suitable surface or part, such as the shell 9, which is concentric to the axis of rotation between the spindle and the fork. This friction and pressure effectively eliminates all shimmy in a caster, regardless of the speed of the movement of the chair equipped with such casters, and irrespective of any unevenness in the floor over which the caster is operated. The spring 10 or 22 does not offer enough resistance to turning to prevent the caster from freely trailing and adjusting itself automatically to changes in direction in which the caster is moved, so that none of the free trailing characteristics of the trailer are lost through the pressure exerted on the shell 9 by the spring arms 19 or 22.

In both examples, the pressure arm 19 or 22 can be detachably coupled to existing types of casters, that shown in Figs. 1 to 3 requiring no screws or other coupling parts because it frictionally grips or clamps upon the base 6, and the engagement of the flanged edge 17 with the recess 5 prevents unintentional disengagement of the member 15 from the base of the fork. Such an arrangement requires no tools for its application to a caster, whereas the form shown in Figs. 4 and 5 requires the drilling and threading of a hole in the base 6 of the fork, and also the use of a screw driver to attach the spring member or detach it.

The spring member 15 or 20 may, of course, be made integral with the fork 6 if desired. Various other ways of providing this spring pressure between the relatively moving parts may be provided, but the examples illustrated indicate how easily this spring pressure may be supplied by a simple attachment without altering the basic design of the casters as heretofore made.

The wheels 2 are usually made several inches in diameter for use on wheelchairs and the problem of shimmy is particularly troublesome when the wheels have diameters of not less than three inches. Usually wheels up to five and six inches diameter are employed, because a chair equipped with casters with such large wheels, rolls easily with minimum requirement of power to push, and the large wheels do not drop into cracks in the floor with resulting shock to an occupant of the chair. With the elimination of shimmy, wheels of any size may be successfully employed.

It will be understood that various changes in the details, materials and arrangements of parts, which have been herein described and illustrated in order to explain the nature of the invention, may be made by those skilled in the art, within the principle and scope of the invention, as expressed in the appended claims.

We claim:
1. In a caster of the type having a U-shaped member, a wheel disposed between the arms of the U and rotatably supported from the arms of the U adjacent their free ends, a mounting spindle passing through the base of the U and rotatably connected thereto, and a part fixed on said spindle with a surface concentric thereto, that improvement for eliminating shimmy therein which comprises an element having a U-shaped portion embracing and detachably connected to the base of said U and having a resilient arm extending therefrom and bearing under pressure on said surface of said part, for yieldingly opposing relative movement of said U-shaped member and spindle.

2. In a caster of the type having a U-shaped fork with a boss drawn in the base of the fork to form a recess in said base opening downwardly into the space between the arms of the fork, a wheel disposed between the arms of said fork and rotatably supported thereby, a mounting spindle extending centrally through the bottom wall of said recess and rotatable therein, ball-bearings mounted on said spindle, one within said recess and the other at the opposite face of the base of the fork, the outer ball-bearing including a cup-shaped shell facing the base of the fork for confining the balls against that face of the U and having a periphery concentric to the axis of said bearings, and the base of the fork extending sidewise from the recess for a substantial distance, that improvement for eliminating shimmy therein which comprises an element having parallel portions embracing and slidably engaging said extension of said base, the arm of the element engaging the inner face of the base of the fork having at its free end edge an inturned flange engaging in said recess to resist sliding movement of said element on said extension in a direction to cause the separation of said element from the fork base, the other arm of the element, which engages the outer face of the extension, having its free end turned laterally away from the arm with the flanged end and resiliently bearing against the periphery of said ball-bearing shell on the outside of said fork, for opposing relative movement between said spindle and fork member.

JOSEPH M. VALLONE.
CHARLES SEDITA.

REFERENCES CITED

The following references are of record in the file of this patent:

UNITED STATES PATENTS

| Number | Name | Date |
| --- | --- | --- |
| 1,482,946 | Serva et al. | Feb. 5, 1924 |
| 1,555,839 | Fries et al. | Oct. 6, 1925 |
| 1,752,183 | Kell | Mar. 25, 1930 |
| 1,844,003 | Brown | Feb. 9, 1932 |
| 1,949,448 | Brokaw et al. | Mar. 6, 1934 |
| 2,021,886 | Carpenter et al. | Nov. 26, 1935 |
| 2,051,627 | Weinmann | Aug. 18, 1936 |
| 2,262,433 | Uecker et al. | Nov. 11, 1941 |